J. T. CURTIS.
SIGNAL OPERATING MEANS.
APPLICATION FILED MAR. 16, 1918.
1,346,703.
Patented July 13, 1920.
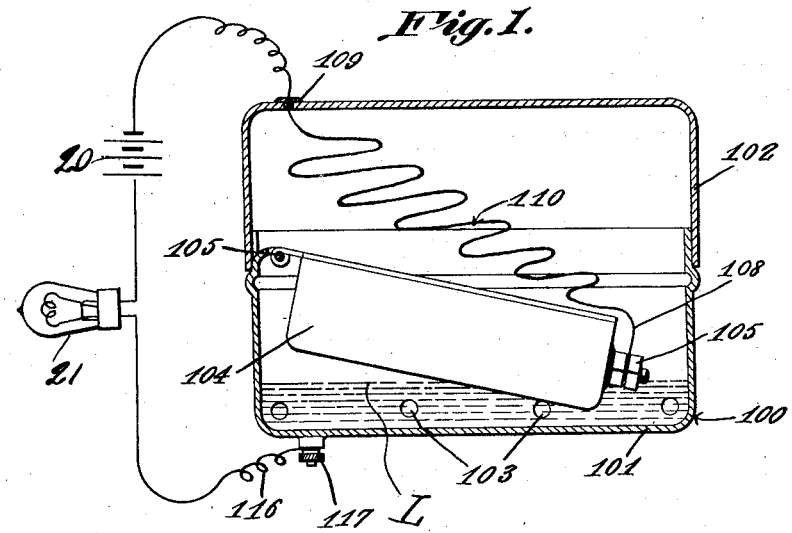
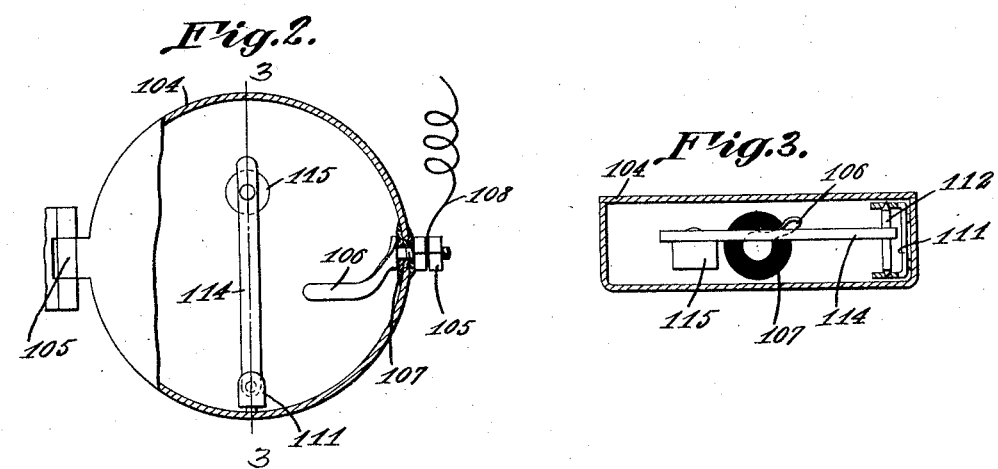
J. T. Curtis, Inventor
Witness
By C. A. Snow & Co.
Attorneys

UNITED STATES PATENT OFFICE.

JESSE TEMPLE CURTIS, OF SEBRING, OHIO, ASSIGNOR OF ONE-THIRD TO FRANCIS LYNN McCLURE AND ONE-THIRD TO FRANKLIN FRITT LE FEVRE, BOTH OF SEBRING, OHIO.

SIGNAL-OPERATING MEANS.

1,346,703.   Specification of Letters Patent.   Patented July 13, 1920.

Application filed March 16, 1918. Serial No. 222,900.

*To all whom it may concern:*

Be it known that I, JESSE T. CURTIS, a citizen of the United States, residing at Sebring, in the county of Mahoning and State of Ohio, have invented a new and useful Signal-Operating Means, of which the following is a specification.

The device forming the subject matter of this application is a float-operated signal adapted to be used in tanks, in the crank cases of internal combustion engines and elsewhere, to indicate when the level of a liquid in the tank or other container has fallen too low. The invention aims to provide novel means, responsive to the swinging action of a float, for opening and closing a signal circuit, and to improve and to enhance the utility of devices of that kind to which the invention appertains. In the drawings:

Figure 1 is a vertical section showing a device constructed in accordance with the invention; Fig. 2 is a transverse section of the float and its mounting, wherein parts appear in elevation; Fig. 3 is a cross section of the float on the line 3—3 of Fig. 2.

The numeral 100 denotes a housing adapted to be supported in a tank, crank case or other container and comprising a base 101 and a cap 102, the base having perforations 103 which admit the liquid L into the housing. A float 104 is hinged at 105 to the base. A spring contact tongue 106 is secured to the float 104 by means of a binding post 105 insulated at 107 from the float. A conductor 108 is attached to the post 105 and passes through an insulating bushing 109 in the cap 102, the cap and the base 101 preferably being made of metal. The conductor 108 includes a tapered zigzag part 110 which acts as a spring and aids in raising the float 104. A U-shaped bracket 111 is secured to the float, the ends of a shaft 112 being journaled in the bracket.

An arm 114 is secured to the shaft 112 and carries a weight 115. A conductor 116 is attached by a binding post 117 or otherwise to the base 101, or elsewhere. The conductor 116 leads to one side of a source 20 of electrical energy. The conductor 108 leads to the other side of the source 20. A signal 21 is interposed in the conductor 116. When the float 104 falls and rises the arm 114 will swing into and out of contact with the tongue 106, thus closing and opening the circuit 108—116 and operating the signal 21.

I claim:—

In a device of the class described, a float; means for hingedly mounting the float for vertical swinging movement about a fixed horizontal axis; a circuit closure embodying a contact member and a swinging arm, both located within the float; and means for pivotally connecting one end of the arm to the float to enable the arm to swing laterally in the same plane with the float and with said axis.

In testimony that I claim the foregoing as my own, I have hereto affixed my signature in the presence of two witnesses.

JESSE TEMPLE CURTIS.

Witnesses:
 EDITH FLUGAN,
 L. A. BANDY.